United States Patent [19]
Huot

[11] 3,979,035
[45] Sept. 7, 1976

[54] TIRE CARRIER FOR STOCK RACKS

[76] Inventor: Tommy J. Huot, Rte. 1, Linn, Mo. 65051

[22] Filed: June 10, 1975

[21] Appl. No.: 585,662

[52] U.S. Cl. ............................ 224/42.24; 224/42.13; 224/42.25; 211/23
[51] Int. Cl.² ........................................ B62D 43/00
[58] Field of Search ............... 224/42.03 R, 42.06, 224/42.13, 42.14, 42.16, 42.23, 42.24, 42.25, 42.46 R, 29 R; 296/37 R, 37.2; 211/23, 24, 5, 19, 20; 248/224

[56] References Cited
UNITED STATES PATENTS

| | | | |
|---|---|---|---|
| 1,094,084 | 4/1914 | Miller | 224/42.25 X |
| 1,759,212 | 5/1930 | Wasserfallen | 224/42.24 |
| 2,772,826 | 12/1956 | Krengel | 224/42.24 |
| 3,301,450 | 1/1967 | Widner | 224/42.24 |

*Primary Examiner*—Robert J. Spar
*Assistant Examiner*—Jerold M. Forsberg
*Attorney, Agent, or Firm*—Glenn K. Robbins

[57] ABSTRACT

A tire carrier comprises a tire support adapted to support a spare tire with the support having inverted J- or U-shaped hooks adapted to be removably fitted over the parallel slats of the stock rack. The tire is held against the rack by means of a tightening chain which is connected at one end to an inverted hook fitting over another slat in the rack with the other end fitted over a J-shaped bolt fitting through one of the conventional bolt openings in the tire rim and an adjustment nut adapted to be tightened against a threaded end of the hook to press or clamp the tire against the rack. The tightening nut is provided with a handle for manual operation and tampering is prevented by a lock having its hasp fitting through an opening in the end of the bolt and around the handle to prevent relative rotation and removal.

3 Claims, 4 Drawing Figures

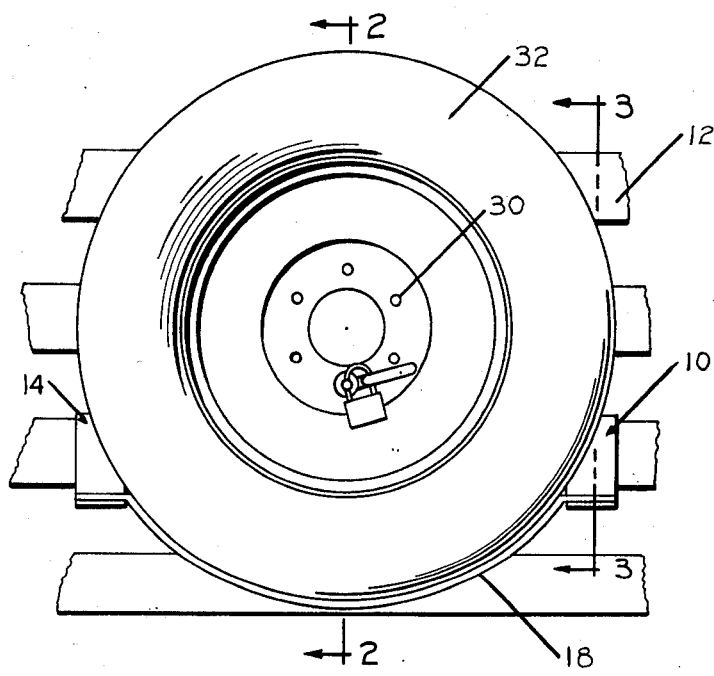
FIG.1
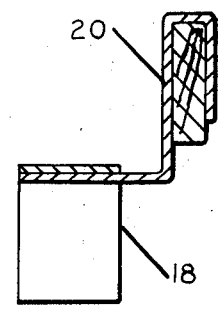
FIG.3
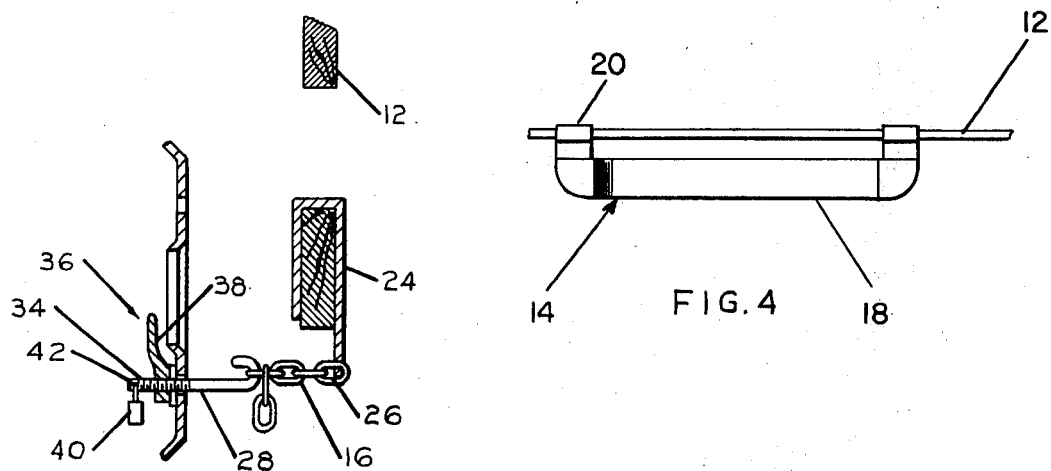
FIG.2
FIG.4

TIRE CARRIER FOR STOCK RACKS

SUMMARY OF THE INVENTION

By means of this invention there has been provided a removable spare tire carrier attachable to a stock rack for pick-up trucks and the like. This spare tire carrier is adapted to be fitted on the side of the stock racks on the exterior of the rack or if desired on the interior. Where fitted on the exterior additional space is provided in the interior of the stock rack for live-stock without any protruberances therein which might damage the stock and also which might damage the tire carrier by movement of the stock there against. Additional space is also provided for loading by mounting on the exterior.

The carrier by means of a special construction is adapted to be simply mounted upon the horizontal slats of the rack without the requirement of any tools. The rack can be simply installed as desired or expeditiously removed in an extremely short period of time.

The rack is comprised of a tire support which is adapted to be fitted simply over the slats of the rack. The tire support has a concave or arcuate rim-like tire supporting member provided with inverted U- or J-shaped hooks at opposite ends which are adapted to fit over a slat. The tire is clamped to the side of the rack by a locking device which comprises a chain connected at one end to a hook fitting on another slat of the rack and adapted to be connected to a threaded J-shaped bolt. The J-shaped bolt at the hook end is fitted through an appropriate link in the chain while the threaded end is fitted through a bolt opening in the rim of the spare tire. A threaded nut-like member is drawn tightly against the exterior of the rim which is facilitated by a handle member connected to the threaded nut like member. This threaded handle which may also be termed a tail tap is used to clamp the spare tire against the sides of the rack by drawing tightly up against the chain through the threaded adjustment.

Locking means to prevent tampering or theft is simply provided by a lock which can be fitted with its hasp passing through an opening in the threaded end of the j-shaped bolt and around the handle. When so locked relative rotation is prevented.

The above features are objects of this invention and further objects will appear in the detailed description which follows and will otherwise be apparent to those skilled in the art.

For the purpose of illustration of this invention there is shown in the accompanying drawing a preferred embodiment thereof. It is to be understood that these drawings are for the purpose of illustration only and that the invention is not limited thereto.

IN THE DRAWING

FIG. 1, is a fragmentary view in side elevation of a truck stock rack provided with the tire carrier of this invention.

FIG. 2, is an enlarged fragmentary view in section taken on the line 2—2 of FIG. 1, showing the connection of the tire carrier to the slats of the stock rack.

FIG. 3, is an enlarged view in section taken on the line 3—3 of FIG. 1.

FIG. 4, is a top plan view on a reduced scale showing the tire support.

DESCRIPTION OF THE INVENTION

Referring now to FIG. 1, the spare tire carrier of this invention is generally indicated by the reference numeral 10 connected to the horizontal slats of a conventional stock rack used on pick-up trucks. The carrier is comprised of an arcuate tire support 14 and a hook and chain locking portion 16.

The arcuate tire support 14 as best shown in FIGS. 1, 3 and 4 is comprised of a rim-like arcuate tire supporting member 18 having connected at opposite ends and extending inwardly from the tire support U- or J-shaped hook members 20 which are adapted to fit over a slat 12 of the stock rack. The entire arcuate tire support may be comprised of sheet metal having welded connections to provide a rigid and strong support frame.

The hook and chain locking portion 16 is best shown in FIGS. 1 and 2. It is comprised of an inverted U- or J-shaped hook 24 having a chain 26 connected at the bottom. A J-shaped bolt 28 is insertable through an opening 30 in the rim of a spare tire 32 as shown in FIG. 2. A threaded end portion 34 of the J-shaped bolt receives an adjustable nut member 36 in order to tighten the spare tire against the slats of the stock rack. The adjustable tightening nut member 36 is further provided with a handle portion 38 to provide for ease in the manual adjustment and tightening of the nut-like tightening member.

In order to provide protection against tampering and theft a locking means is provided through a lock 40. This lock fits through a hole 42 in the end of the threaded shaft 34 of the J-shaped bolt. The hasp of the lock passing through the hole is fitted around the handle of the tightening member 36 as shown in FIG. 1. When so positioned the hasp fitting through the opening 42 of the J-shaped hook and around the handle prevents free rotation of the handle and its removal until the lock has been removed.

USE

The spare tire carrier of this invention is very simply installed on a stock rack of the pick-up truck. It will be understood that other types of racks may be used as desired.

The arcuate tire support 14 is simply fitted upon a rack slat with the inverted U-shaped hook portion 20 fitting over the flat and thereby supporting the tire support by gravity. The hook member 24 is then positioned on a higher slat and the spare tire is then supported upon the arcuate tire support. The J-shaped bolt is then fitted through an opening 30 in the rim of the spare tire and the hook portion is hooked into a link of the chain 16 at an appropriate link. The adjustable nut-like member 36 is then adjusted by turning the handle upon the threaded end of the shaft to tighten the spare tire against the stock rack. When so tightened the spare tire can be locked as desired by simply inserting the hasp 42 of the lock through the opening in the end of the threaded J-shaped hook and around the handle portion 38 and locked in position.

The spare tire carrier can be simply assembled without any special tools at all in the obvious fashion as described. It can also be simply removed when so desired. The carrier is portable and fits together compactly when stored or transported from one position of use to another.

Various changes and modifications may be made within this invention as will be readily apparent to those skilled in the art. Such changes and modifications are within the scope and teaching of this invention as defined by the claims appended hereto.

What is claimed is:

1. A spare tire carrier for truck racks having parallel slats, said carrier comprising an arcuate tire support, said support being comprised of a metal frame having at an upper portion a pair of horizontally spaced inverted U-shaped hook members adapted to be removably fitted over a rack slot and a lower portion of the tire support comprising an arcuate rim like member supporting a tire thereon and securing means for securing said tire against the rack, said securing means comprising a hook adapted to fit over a rack slot and an adjustable chain connecting said slat hook to a second hook member having a threaded end fitting through a bolt opening in the spare tire wheel and a nut-like member threadably engageable with the threaded end of the hook adapted to be adjusted thereon to draw the spare tire tightly against the rack, whereby when the spare tire is resting on the arcuate tire support movement thereof is prevented when the securement means is properly engaged and secured.

2. The tire carrier of claim 1, in which the nut-like member has a handle for manual adjustment of the nut.

3. The tire carrier of claim 2, in which the threaded end of the second hook member has an end portion having an opening receiving a shackle portion of a lock for locking against the handle to prevent tampering.

* * * * *